United States Patent [19]
Matsunaga

[11] Patent Number: 5,481,315
[45] Date of Patent: Jan. 2, 1996

[54] TELEVISION RECEIVER WITH MULTIPLE PICTURE SCREEN AT APPROPRIATE ASPECT RATIO

[75] Inventor: Mitsuhiro Matsunaga, Tokyo, Japan

[73] Assignee: NEC Corporation, Tokyo, Japan

[21] Appl. No.: 358,948

[22] Filed: Dec. 19, 1994

[30] Foreign Application Priority Data

Dec. 22, 1993 [JP] Japan .................................. 5-324974

[51] Int. Cl.⁶ .................................................. H04N 5/45
[52] U.S. Cl. .................... 348/565; 348/567; 348/568; 348/566; 348/584; 348/588
[58] Field of Search ...................... 348/578, 564, 348/565, 566, 567, 568, 581, 582, 584, 588, 598, 599, 705, 706, 704; 358/183, 180; H04N 5/262, 5/265, 5/45

[56] References Cited

U.S. PATENT DOCUMENTS 4,992,874  2/1991  Willis ....................... 348/565
5,138,455  8/1992  Okumura ................... 348/568
5,251,015  10/1993  Rumreich ................... 348/568

FOREIGN PATENT DOCUMENTS

61-194981  8/1986  Japan.

Primary Examiner—James J. Groody
Assistant Examiner—Sherrie Hsia
Attorney, Agent, or Firm—Foley & Lardner

[57] ABSTRACT

A television receiver has horizontal reducing filter and a vertical reducing filter independently responsive to a first filter control signal and a second filter control signal for reducing auxiliary luminance/chrominance signals indicative of a sub-picture at an arbitrary aspect ratio, and a display unit reproduces a main picture and a reduced auxiliary picture on a screen in an overlapped manner.

13 Claims, 6 Drawing Sheets

TELEVISION RECEIVER WITH MULTIPLE PICTURE SCREEN AT APPROPRIATE ASPECT RATIO

FIELD OF THE INVENTION

This invention relates to a television receiver with a multiple picture screen and, more particularly, to a television receiver with a screen concurrently displaying a plurality of pictures.

DESCRIPTION OF THE RELATED ART

A typical example of the television receiver with a multiple picture screen is disclosed in Japanese Patent Publication of Unexamined Application No. 61-194981. The prior art television receiver concurrently reproduces a large sized main picture and a small-sized sub-picture partially overlapped with the main picture. The prior art television receiver thins out the sweeps for shrinking the vertical direction of the sub-picture, and changes a ratio of the read-out clock frequency to the write-in clock frequency for shrinking the horizontal direction of the sub-picture.

Recently, the television screen has been scaled up, and a television receiver with a wide screen has become popular with users. The television receiver laterally reduces an image reproduced on the wide screen, or adds black areas on the upper and lower sides of the image called a letter box. However, there are different image reproduction standards such as NTSC standards and PAL standards, and, accordingly, the video signals are generated differently. In this situation, if the sub-picture is reproduced on the screen of the television receiver designed in the different standards, the video signal reproduces the sub-pictures in a different aspect ratio, because the main picture is different in vertical line numbers from the sub-picture.

In order to regulate the aspect ratio, the prior art television receiver changes the clock frequency for reading out the data codes indicative of the sub-picture from the memory unit.

Thus, the prior art television receiver changes only the width of the sub-picture. The prior art television receiver encounters a problem in that the sub-picture is too large or small with respect to the main picture. This is because of the fact that the height of the sub-picture is fixed by the video signal generated in accordance with the employed standards.

Moreover, the prior art television receiver is complex, because a plurality of clock frequencies are required for reproducing the sub-picture in the different standards.

Yet another problem encountered in the prior art television receiver is beats due to a crosstalk between the signal path for the oscillators and another signal path upon change of the clock frequency. If a shield is provided in the prior art television receiver, the shield eliminates the influence of the beats. However, the spectrum of the noise is so wide that the prior art television receiver requires a complex shield structure. This results in a high production cost.

SUMMARY OF THE INVENTION

It is therefore an important object of the present invention to provide a television receiver which is free from the problems inherent in the prior art television receiver.

To accomplish the object, the present invention proposes to independently thin out digital image signals in a first direction corresponding to a width of a sub-picture and in a second direction corresponding to a height of the sub-picture.

In accordance with the present invention, there is provided a television receiver comprising: a) a main video signal processing unit responsive to a main video signal indicative of a main picture for generating main picture carrying signals and main synchronous signals; b) an auxiliary video signal processing unit responsive to an auxiliary video signal indicative of a sub-picture for generating sub-picture carrying signals and auxiliary synchronous signals; c) a first controlling unit for generating a first control signal, a second control signal and a shift control signal, the first control signal and the second control signal being independently variable in value; d) an image reducing unit responsive to the first control signal for thinning out the sub-picture carrying signals in a first direction corresponding to a width of the sub-picture, the image reducing unit being further responsive to the second control signal for thinning out the sub-picture carrying signals in a second direction corresponding to a height of the sub-picture, the image reducing unit generating first reduced sub-picture carrying signals indicative of a reduced sub-picture; e) a display unit supplied with the main synchronous signals, and having a screen where the main picture and the reduced sub-picture are reproduced; f) a second controlling unit responsive to the shift control signal for selectively outputting a write-in timing signal generated on the basis of the auxiliary synchronous signals and a read-out timing signal generated on the basis of the main synchronous signals, the second controlling unit being further producing a switch control signal for indicating a location of the reduced sub-picture on the screen; g) a memory unit responsive to the write-in timing signal for storing image data indicated by the first reduced sub-picture carrying signal, the memory unit being further responsive to the read-out timing signal for outputting the image data as second reduced sub-picture carrying signals; and h) a switching unit having a first input port supplied with the main picture carrying signals, a second input port supplied with the second reduced sub-picture carrying signals and an output port connected to the display unit, and responsive to the switch control signal for selectively supplying the main picture carrying signals and the second reduced sub-picture carrying signals to the display unit.

The picture carrying signals may be luminance/chrominance signals, luminance/color difference signals or color signals indicative of the primaries.

BRIEF DESCRIPTION OF THE DRAWINGS

The features and advantages of the television receiver according to the present invention will be more clearly understood from the following description taken in conjunction with the accompanying drawings in which.

DESCRIPTION OF THE PREFERRED EMBODIMENTS

First Embodiment

Figure 1:
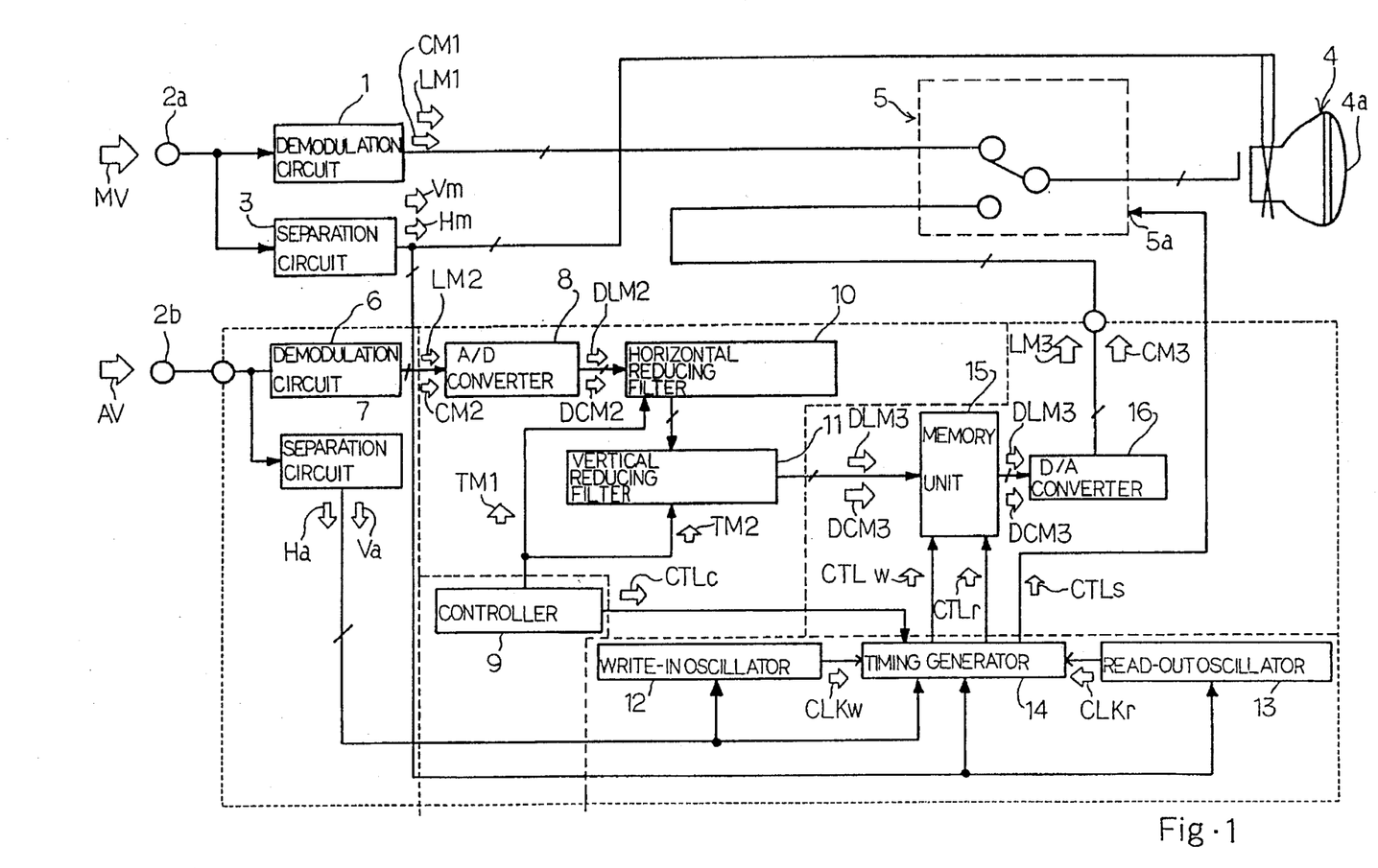
FIG. 1 is a block diagram showing the circuit arrangement of a television receiver according to the present invention.

Referring to FIG. 1 of the drawings, a television receiver embodying the present invention largely comprises a main demodulation circuit 1 connected to a first input terminal 2a, a main separation circuit 3 also connected to the first input terminal 2a, a display unit 4 with a screen 4a connected to the separation circuit 3 and a switching unit 5 connected between the main demodulation circuit 1 and the display unit 4. A main video signal MV indicative of a main picture is supplied through the first input terminal 2a to the main demodulation circuit 1 and the main separation circuit 3. The demodulation circuit 1 demodulates the main video signal MV to a luminance signal LM1 and chrominance signals CM1, and the chrominance signals are a red-yellow signal and a blue-yellow signal. On the other hand, the separation circuit 3 extracts a main vertical synchronous signal Vm and a main horizontal synchronous signal Hm from the main video signal MV. The display unit 4 is responsive to the luminance signal LM1 and the chrominance signals CM1 in synchronism with the main vertical and horizontal synchronous signals Vm and Hm for reproducing the main picture on the screen 4a. The main demodulation circuit 1 and the main separation circuit 3 as a whole constitute a main video signal processing unit, and the luminance/chrominance signals LM1 and CM1 and the main vertical/horizontal synchronous signals Vm and Hm serve as main picture carrying signals and main synchronous signals, respectively.

The television receiver further comprises an auxiliary demodulation circuit 6 connected to a second input terminal 2b and an auxiliary separation circuit 7 also connected to the second input terminal 2b, and an auxiliary video signal AV is supplied through the second input terminal 2b to the auxiliary demodulation circuit 6 and the separation circuit 7. The auxiliary demodulation circuit 6 demodulates the auxiliary video signal AV to a luminance signal LM2 and chrominance signals CM2, and the auxiliary separation circuit 7 extracts an auxiliary vertical synchronous signal Va and an auxiliary horizontal synchronous signal Ha from the auxiliary video signal AV. The auxiliary demodulation circuit 6 and the auxiliary separation circuit 7 as a whole constitute an auxiliary video signal processing unit, and the luminance/chrominance signals LM2 and CM2 and the auxiliary vertical/horizontal synchronous signals Va and Ha serve as sub-picture carrying signals and auxiliary synchronous signals.

The television receiver further comprises an analog-to-digital converter 8 connected to an output port of the auxiliary demodulation circuit 6, a controller 9 for producing first and second filter control signals TM1 and TM2, a horizontal reducing filter 10 connected to the analog-to-digital converter 8 and responsive to the first filter control signal TM1 and a vertical reducing filter 11 connected to the horizontal reducing filter 10 and responsive to the second filter control signal TM2. The first filter control signal TM1 is indicative of filtering coefficients for the horizontal reducing filter 10, and the second filter control signal TM2 is indicative of filtering coefficients for the vertical reducing filter 11. The controller 9 serves as a first controlling unit.

The analog-to-digital converter 8 converts the auxiliary luminance signal LM2 and the auxiliary chrominance signals CM2 into a digital luminance signal DLM2 and digital chrominance signals DCM2, and the digital luminance signal DLM2 and the digital chrominance signals DCM2 are supplied to the horizontal reducing filter 10.

The horizontal reducing filter 10 is responsive the first filter control signal TM1 for decreasing the amount of luminance data and the amount of chrominance data in a direction corresponding to the width of the sub-picture. The horizontal reducing filter 10 supplies the digital luminance signal DLM2 and the digital chrominance signals DCM2 thus treated to the vertical reducing filter 11, and the vertical reducing filter 11 is responsive to the second filter control signal TM2 for decreasing the amount of luminance data and the amount of chrominance data in a direction corresponding to the height of the sub-picture. The first filter control signal TM1 is independent of the second filter control signal TM2, and the sub-picture is reduced at an arbitrary aspect ratio.

The digital luminance signal and the digital chrominance signals thus treated by the horizontal and vertical reducing filters 10 and 11 are hereinbelow referred to as "a reduced digital luminance signal DLM3" and "reduced digital chrominance signals DCM3", respectively.

The television receiver further comprises a write-in oscillator 12 connected to the output port of the auxiliary separation circuit 7, a read-out oscillator 13 connected to the output port of the main separation circuit 3, a timing generator 14 connected to the output ports of the main and auxiliary separation circuits 3 and 7 and the output ports of the write-in/read-out oscillators 12 and 13, a memory unit 15 for storing reduced image information indicated by the reduced digital luminance and chrominance signals DLM3 and DCM3 and a digital-to-analog converter 16 connected between the memory unit 15 and the switching unit 5. The write-in oscillator 12 generates a write-in clock signal CLKw phase-locked with the synchronous signals of the separation circuit 7. On the other hand, the read-out oscillator 13 generates a read-out clock signal CLKr phase-locked with the synchronous signals of the separation circuit 3. The write-in clock signal CLKw and the read-out clock signal CLKr are supplied to the timing generator 14, and the timing generator 14 selectively generates a write-in control signal CTLw, a read-out control signal CTLr and a switch control signal CTLs in response to a control signal CTLc produced by the controller 9.

While the timing generator 14 is supplying the write-in control signal CTLw to the memory unit 15, the reduced digital luminance signal DLM3 and the reduced digital chrominance signals DCM3 are sequentially stored in the memory unit 15. The memory unit 15 is further responsive to the read-out control signal CTLr for reading out the reduced digital luminance signal DLM3 and the reduced digital chrominance signals DCM3.

The reduced digital luminance signal DLM3 and the reduced digital chrominance signals DCM3 thus read out from the memory unit 15 are supplied to the digital converter 16, and are converted to a reduced auxiliary luminance signal LM3 and a reduced auxiliary chrominance signals CM3.

The analog-to-digital converter 8, the horizontal reducing filter 10 and the vertical reducing filter 11 as a whole constitute an image reducing unit, and the write-in oscillator 12, the read-out oscillator 13 and the timing generator 14 form in combination a second controlling unit. The memory unit 15 and the digital-to-analog converter 16 as a whole constitute a memory unit.

The switch control signal CTLs is supplied to a control node 5a of the switch unit 5, and the switch unit 5 selectively transfers the main luminance signal and the main chrominance signals LM1/CM1 and the reduced auxiliary luminance signal LM3 ,and the reduced auxiliary chrominance signals CM3 to the display unit 4. While the main vertical synchronous signal Vm and the main horizontal synchronous signal Hm are indicating the outside of a predetermined area on the screen 4a assigned to the reduced sub-picture, the switch unit 5 transfers the luminance signal LM1 and the chrominance signals CM1, and the display unit 4 reproduces the main picture on the screen 4a. When the main vertical synchronous signal Vm and the horizontal synchronous signal Hm indicate the predetermined area on the screen 4a, the timing generator 14 changes the switch control signal CTLs so that the switch unit 5 transfers the reduced auxiliary luminance signal LM3 and the reduced auxiliary chrominance signals CM3 to the display unit 4. Then, the display unit 4 reproduces the reduced sub-picture in the predetermined area, and the main picture is overlapped with the reduced sub-picture on the screen 4a.

Table shows relations between the main picture and the reduced sub-picture.

TABLE

| screen | | | | | |
|---|---|---|---|---|---|
| | | sweep | 1/9 size | | |
| main | aux. | lines | height | width | sweep lines |
| NTSC | NTSC | 216 | 1/3 | 1/3 | 72 |
| | letter box | 162 | 4/9 | 4/9 | 72 |
| | reduce | 216 | 1/3 | 4/9 | 72 |
| | PAL/ SECAM | 252 | 2/7 | 1/3 | 72 |
| PAL/SECAM | NTSC | 216 | 7/18 | 1/3 | 84 |
| | letter box | 162 | 14/27 | 4/9 | 84 |
| | reduce | 216 | 7/18 | 4/9 | 84 |
| | PAL/ SECAM | 252 | 1/3 | 1/3 | 84 |

As shown in the above table, if the main picture is reproduced in the NTSC system, the available sweep lines are 216, and a third of the available sweep lines, i.e., 72 sweep lines are required to reproduce the sub-picture represented by the auxiliary video signal AV in the NTSC system at reduction ratio of 1/9. On the other hand, if the sub-picture is represented by the auxiliary video signal AV in the PAL system, 252 sweep lines are required, and is greater than the sweep lines in the NTSC system at 17 percent. For this reason, if the sub-picture is reduced at 2/7, the reduced sub-picture is reproduced on the same sweep lines, i.e., 72 sweep lines. As a result, the reduced sub-pictures have the same aspect ratio.

Figure 2:
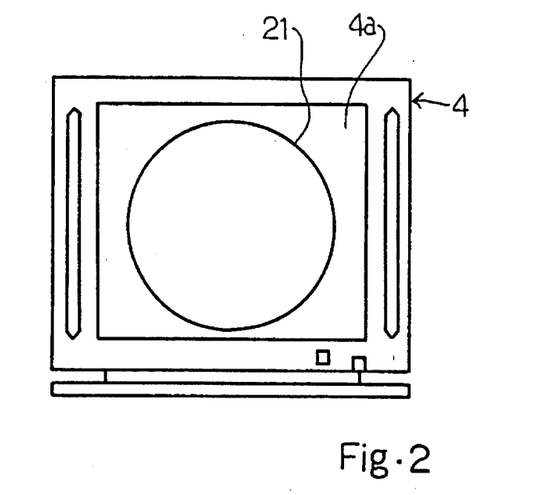
FIG. 2 is a front view showing a main picture reproduced on a screen of a display unit.
Figure 3:
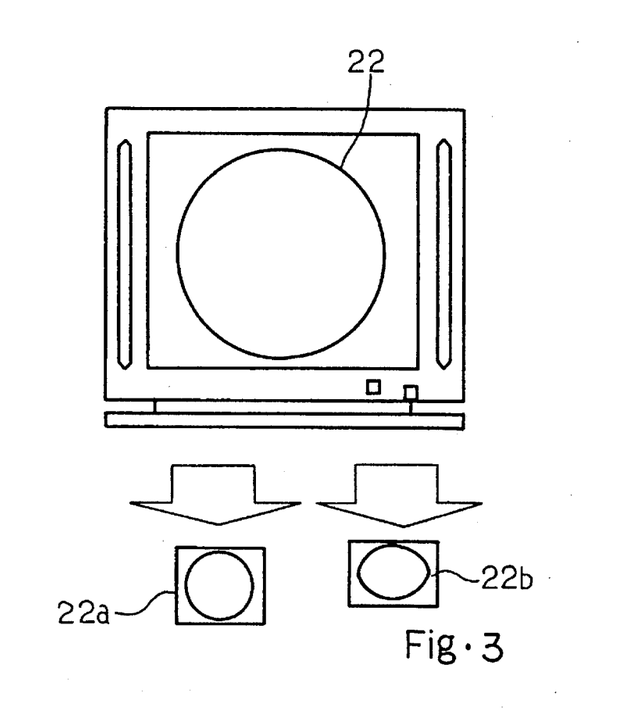
FIG. 3 is a front view showing two reduced sub-pictures reproduced by the prior art television receiver and the television receiver according to the present invention.
Figure 4:
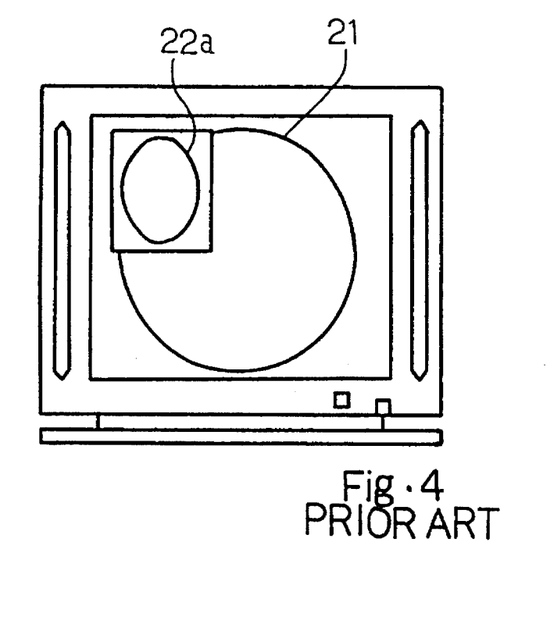
FIG. 4 is a front view showing the main picture and the reduced sub-picture reproduced on the screen of the prior art television receiver.
Figure 5:
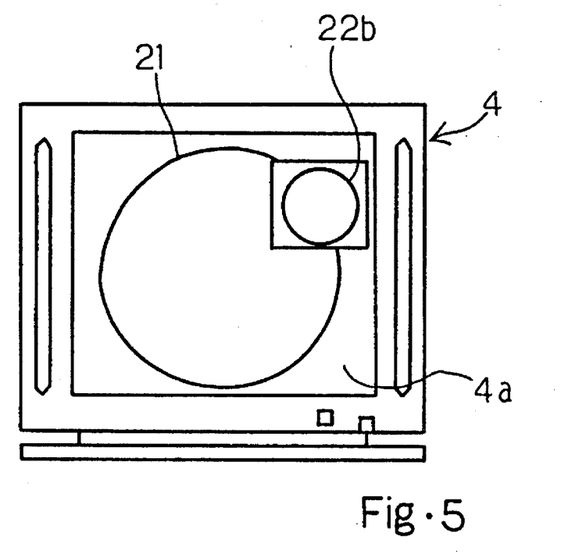
FIG. 5 is a front view showing the main picture and the reduced sub-picture reproduced on the screen of the television receiver according to the present invention.

FIG. 2 shows a main picture 21 reproduced on the screen 4a of the display unit 4, and FIG. 3 shows a sub-picture 22. If the sub-picture 22 is reduced through the prior art system, the reduced picture is a similar FIG. 22a than the original sub-picture 22 regardless of the standards of the auxiliary video signal AV. On the other hand, if the auxiliary video signal AV is different in standards from the main video signal, the television receiver according to the present invention reduces the original sub-picture 22 to a compressed FIG. 22b. If the reduced sub-picture 22a is concurrently reproduced on the screen 4a together with the main picture 21, the reduced sub-picture 22a is vertically elongated as shown in FIG. 4 due to the difference in the standards. On the other hand, if the reduced sub-picture 22b and the main picture are concurrently reproduced on the screen 4a, the reduced sub-picture 22b as shown in FIG. 5 becomes similar to the original sub-picture 22.

As will be appreciated from the foregoing description, the television receiver according to the present invention independently determines the first filter control signal TM1 and the second filter control signal TM2, and the sub-picture is reduced at a constant ratio regardless of the standards of the main and auxiliary video signals MV and AV.

Moreover, the write-in oscillator 12 and the read-out oscillator 13 are constant in frequency, and no frequency change is required. As a result, the television receiver according to the present invention is free from the beats due to the noise at the frequency change, and a complex shield is not necessary for the television receiver according to the present invention.

Figure 6:
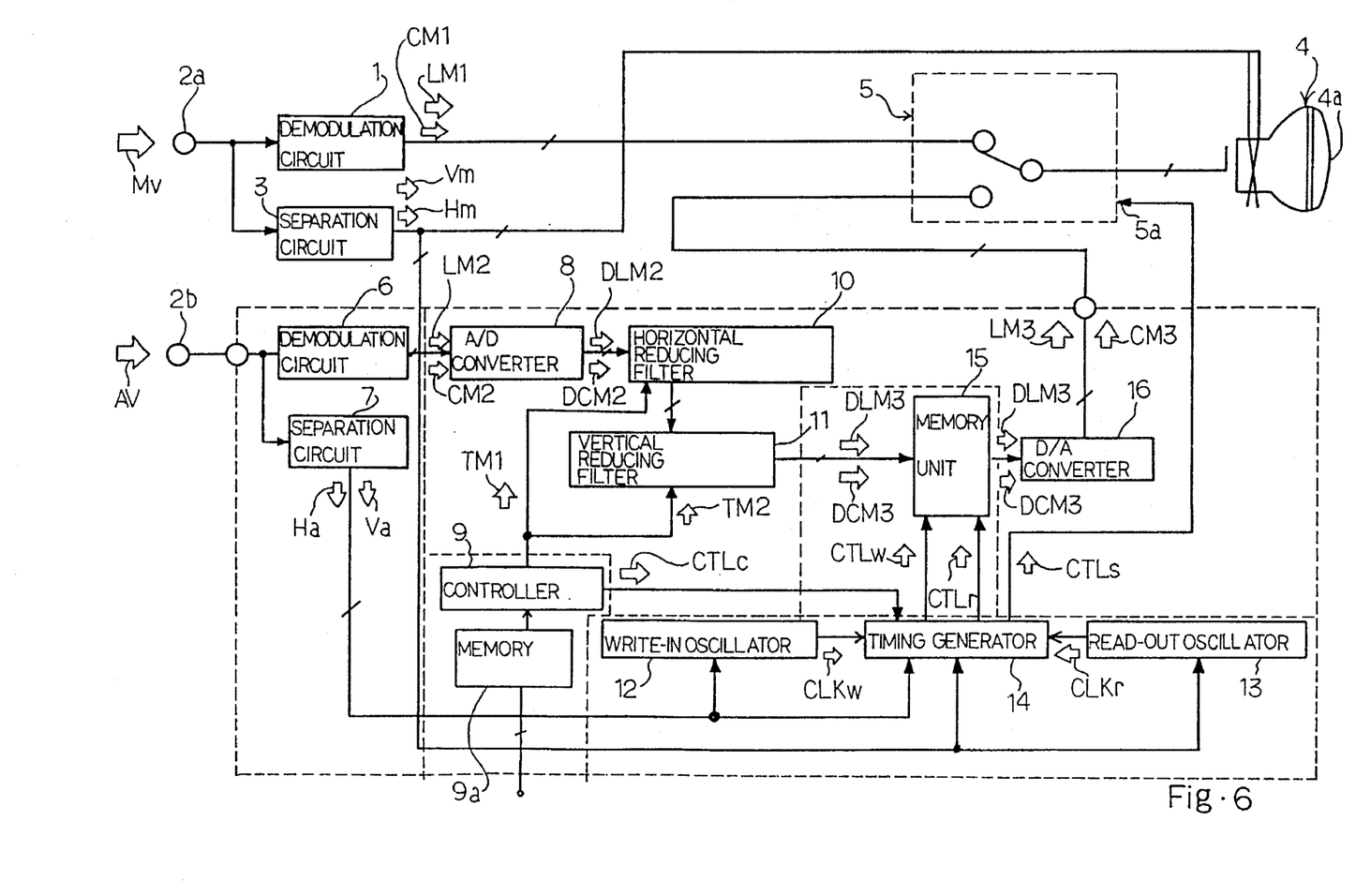
FIG. 6 is a block diagram showing a modification of the television receiver shown in FIG. 1.

The television receiver implementing the first embodiment may be equipped with a memory unit 9a (see FIG. 6) for storing data information indicative of the value of the first filter control signal TM1 and the coefficient of the second filter control signal TM2. The data information is either fixed or rewritable, and the controller 9 independently changes the value of the first filter control signal TM1 and the value of the second filter control signal TM2.

For this reason, the manufacturer can fix the circuit arrangement of the controller 9, and the main and auxiliary video signals of any standard are processed by changing the data information stored in the memory unit 9a.

Second Embodiment

Figure 7:
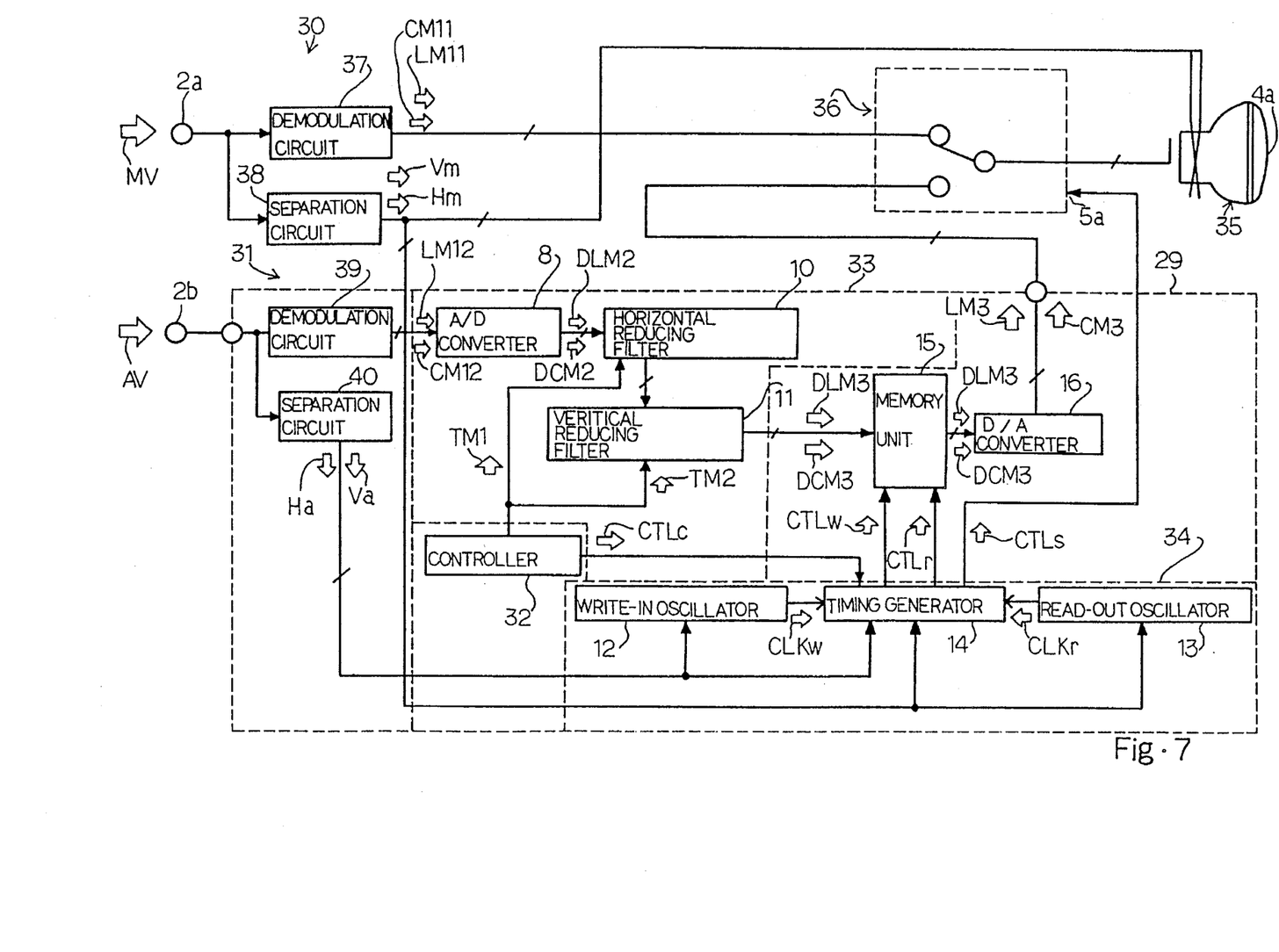
FIG. 7 is a block diagram showing another television receiver according to the present invention.

Turning to FIG. 7 of the drawings, another television receiver embodying the present invention largely comprises a memory unit 29, a main video signal processing unit 30, an auxiliary video signal processing unit 31, a first controlling unit 32, an image reducing unit 33, a second controlling unit 34, a display unit 35 and a switch unit 36. The memory unit 29, the first controller 32, the image reducing unit 33, the second controlling unit 34, the display unit 35 and the switch unit 36 are similar to those of the first embodiment, and components of these units are labeled with the same references designating the corresponding components of the first embodiment without detailed description.

The main video signal processing unit 30 has a main demodulation circuit 37 and a main separation circuit 38, and the auxiliary video signal processing unit 31 is constituted by an auxiliary demodulation circuit 39 and an auxiliary separation circuit 40. The main demodulation circuit 37 demodulates the main video signal MV to a luminance signal LM11 and a color difference signal CM11, and the auxiliary demodulation circuit 39 demodulates the auxiliary video signal AV to a luminance signal LM12 and a color difference signal CM12. The main separation circuit 38 separates horizontal and vertical synchronous signals Vm and Hm from the main video signal VM, and the auxiliary separation circuit 40 extracts horizontal and vertical synchronous signals Ha and Va from the auxiliary video signal AV. In this instance, DCM2, DCM3 and CM3 are representative of a digital color difference signal, first and second reduced digital color difference signals and a reduced color difference signal, respectively.

The other units 32 to 36 behave similarly to those of the first embodiment, and achieve the advantages as similar to the first embodiment. Though not shown in FIG. 7, a memory unit may be provided for the controller 32 as similar to the first embodiemnt.

Third Embodiment

Figure 8:
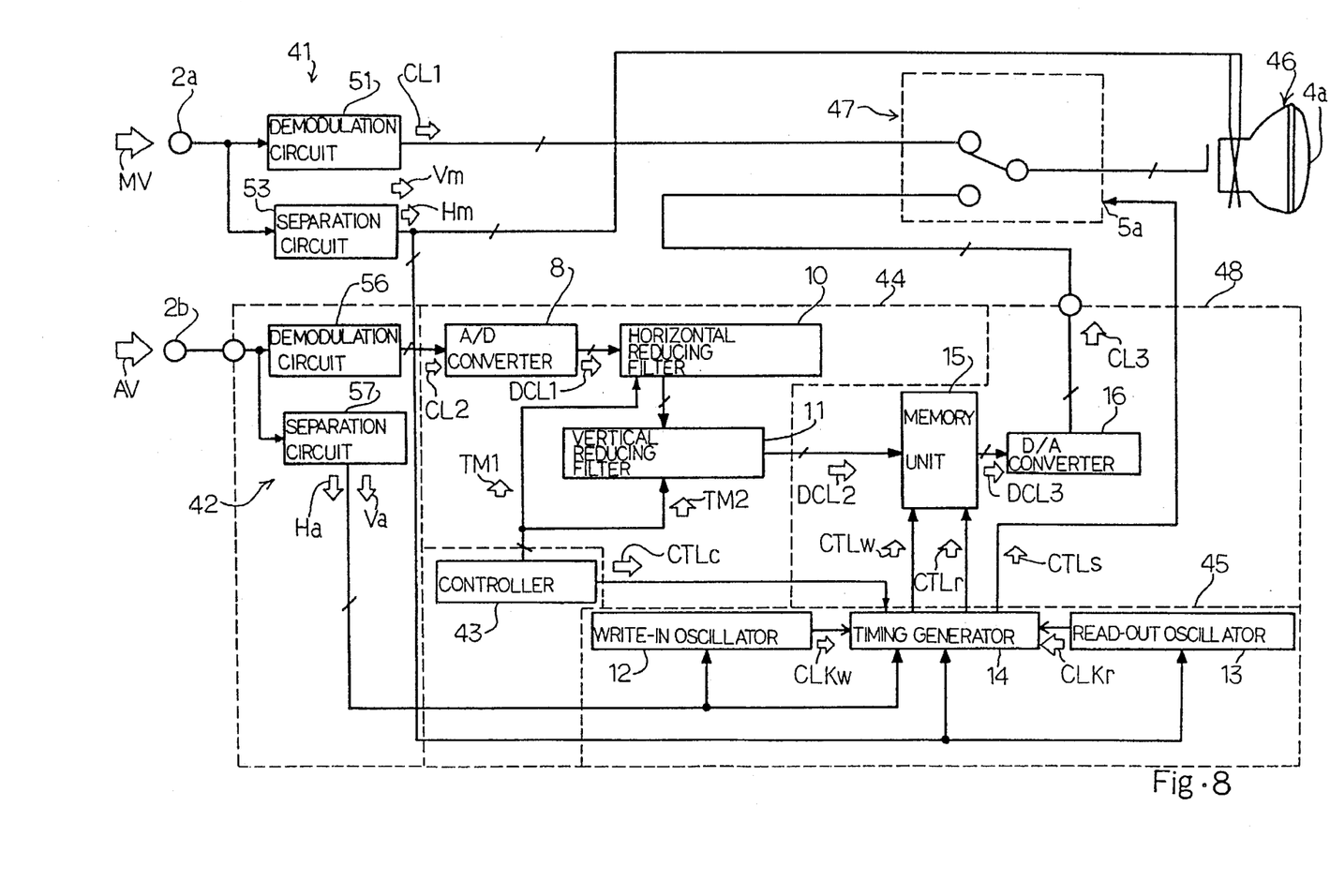
FIG. 8 is a block diagram showing yet another television receiver according to the present invention.

Turning to FIG. 8 of the drawings, yet another television receiver embodying the present invention largely comprises a main video signal processing unit 41, an auxiliary video signal processing unit 42, a first controlling unit 43, an image reducing unit 44, a second controlling unit 45, a display unit 46, a switch unit 47 and a memory unit 48. The first controller 43, the image reducing unit 44, the second controlling unit 45, the display unit 46, the switch unit 47 and the memory unit 48 are similar to those of the first embodiment, and components of these units are labeled with the same references designating the corresponding components of the first embodiment without detailed description.

The main video signal processing unit 41 has a main demodulation circuit 51 and a main separation circuit 53, and the auxiliary video signal processing unit 42 is constituted by an auxiliary demodulation circuit 56 and an auxiliary separation circuit 57. The main demodulation circuit 51 demodulates the main video signal MV to three color signals CL indicative of the primaries, i.e, red, green and blue, and the auxiliary demodulation circuit 39 also demodulates the auxiliary video signal AV to three color signals CL2. The main separation circuit 53 separates horizontal and vertical synchronous signals Vm and Hm from the main video signal VM, and the auxiliary separation circuit 57 extracts horizontal and vertical synchronous signals Ha and Va from the auxiliary video signal AV. The analog-to-digital converter 8 converts the three color signals CL2 to digital three color signals DCL1, and the horizontal reducing filter 10 and the vertical reducing filter 11 supplies first reduced digital three color signals DCL2 to the memory unit 15. Second reduced digital three color signals DCL3 are supplied from the memory unit 15 to the digital-to-analog converter 16, and is changed to reduced three color signals CL3.

The other units 43 to 47 behave similarly to those of the first embodiment, and achieve the advantages as similar to the first embodiment. Though not shown in FIG. 8, a memory unit may be provided for the controller 43 as similar to the first embodiemnt.

Although particular embodiments of the present invention have been shown and described, it will be obvious to those skilled in the art that various changes and modifications may be made without departing from the spirit and scope of the present invention.

What is claimed is:

1. A television receiver, comprising:
    a) a main video signal processing unit responsive to a main video signal indicative of a main picture for generating main picture carrying signals and main synchronous signals;
    b) an auxiliary video signal processing unit responsive to an auxiliary video signal indicative of a sub-picture for generating sub-picture carrying signals and auxiliary synchronous signals;
    c) a first controlling unit for generating a first control signal, a second control signal and a shift control signal, said first control signal and said second control signal being independently variable in value;
    d) an image reducing unit responsive to said first control signal for thinning out said sub-picture carrying signals in a first direction corresponding to a width of said sub-picture, said image reducing unit being further responsive to said second control signal for thinning out said sub-picture carrying signals in a second direction corresponding to a height of said sub-picture, said image reducing unit generating first reduced sub-picture carrying signals indicative of a reduced sub-picture;
    e) a display unit supplied with said main synchronous signals, and having a screen where said main picture and said reduced sub-picture are reproduced;
    f) a second controlling unit responsive to said shift control signal for selectively outputting a write-in timing signal generated on the basis of said auxiliary synchronous signals and a read-out timing signal generated on the basis of said main synchronous signals, said second controlling unit further producing a switch control signal;
    g) a memory unit responsive to said write-in timing signal for storing image data indicated by said first reduced sub-picture carrying signals, said memory unit being further responsive to said read-out timing signal for outputting said image data as second reduced sub-picture carrying signals; and
    h) a switching unit having a first input port supplied with said main picture carrying signals, a second input port supplied with said second reduced sub-picture carrying signals and an output port connected to said display unit, and responsive to said switch control signal for selectively supplying said main picture carrying signals and said second reduced sub-picture carrying signals to said display unit.

2. The television receiver as set forth in claim 1, in which said main video signal processing unit has a main demodulation circuit for producing main luminance and chrominance signals from the main video signal and a main separation circuit for extracting main vertical and horizontal synchronous signals from said main video signal, and said auxiliary video signal processing unit has an auxiliary demodulation circuit for producing auxiliary luminance and chrominance signals from the auxiliary video signal and an auxiliary separation circuit for extracting auxiliary vertical and horizontal synchronous signals from said auxiliary video signal, said main luminance and chrominance signals, said main vertical and horizontal synchronous signals, said auxiliary luminance and chrominance signals and said auxiliary vertical and horizontal synchronous signals serving as said main picture carrying signals, said main synchronous signals, said sub-picture carrying signals and said auxiliary synchronous signals, respectively.

3. The television receiver as set forth in claim 2, in which said image reducing unit comprises:
    an analog-to-digital converter for converting said auxiliary luminance and chrominance signals into digital luminance and chrominance signals,
    a horizontal reducing filter responsive to said first control signal for thinning out said digital luminance and chrominance signals in said first direction, and
    a vertical reducing filter responsive to said second control signal for thinning out said digital luminance and chrominance signals in said second direction, said horizontal reducing filter and said vertical reducing filter producing first reduced digital luminance and chrominance signals serving as said first reduced sub-picture carrying signals.

4. The television receiver as set forth in claim 3, in which said memory unit comprises a rewritable memory responsive to said write-in timing signal for storing said image data indicated by said first reduced digital luminance and chrominance signals, said memory unit being further responsive to said read-out timing signal for outputting said image data in a digital form, and a digital-to-analog converter supplied with said image data from said rewritable memory for producing reduced luminance and chrominance signals serving as said second reduced sub-picture carrying signals.

5. The television receiver as set forth in claim 3, in which said first controlling unit is associated with a memory unit for storing a first piece of control data information indicative of the value of said first control signal serving as first coefficients used in a digital filtering and a second piece of control data information indicative of the value of said second control signal serving as second coefficients used in a digital filtering.

6. The television receiver as set forth in claim 1, in which said main video signal processing unit has a main demodulation circuit for producing main luminance and color difference signals from the main video signal and a main separation circuit for extracting main vertical and horizontal synchronous signals from said main video signal, and said auxiliary video signal processing unit has an auxiliary demodulation circuit for producing auxiliary luminance and color difference signals from the auxiliary video signal and an auxiliary separation circuit for extracting auxiliary vertical and horizontal synchronous signals from said auxiliary video signal, said main luminance and color difference signals, said main vertical and horizontal synchronous signals, said auxiliary luminance and color difference signals and said auxiliary vertical and horizontal synchronous signals serving as said main picture carrying signals, said main synchronous signals, said sub-picture carrying signals and said auxiliary synchronous signals, respectively.

7. The television receiver as set forth in claim 6, in which said image reducing unit comprises:

an analog-to-digital converter for converting said auxiliary luminance and color difference signals into digital luminance and color difference signals, a horizontal reducing filter responsive to said first control signal for thinning out said digital luminance and color difference signals in said first direction, and a vertical reducing filter responsive to said second control signal for thinning out said digital luminance and color difference signals in said second direction, said horizontal reducing filter and said vertical reducing filter producing first reduced digital luminance and color difference signals serving as said first reduced sub-picture carrying signals.

8. The television receiver as set forth in claim 7, in which said memory unit comprises a rewritable memory responsive to said write-in timing signal for storing said image data indicated by said first reduced digital luminance and color difference signals, said memory unit being further responsive to said read-out timing signal for outputting said image data in a digital form, and a digital-to-analog converter supplied with said image data from said rewritable memory for producing reduced luminance and color difference signals serving as said second reduced sub-picture carrying signals.

9. The television receiver as set forth in claim 8, in which said first controlling unit is associated with a memory unit for storing a first piece of control data information indicative of the value of said first control signal serving as first coefficients used in a digital filtering and a second piece of control data information indicative of the value of said second control signal serving as second coefficients used in a digital filtering.

10. The television receiver as set forth in claim 1, in which said main video signal processing unit has a main demodulation circuit for producing main color signals indicative of three primary colors from the main video signal and a main separation circuit for extracting main vertical and horizontal synchronous signals from said main video signal, and said auxiliary video signal processing unit has an auxiliary demodulation circuit for producing auxiliary color signals indicative of said three primary colors from the auxiliary video signal and an auxiliary separation circuit for extracting auxiliary vertical and horizontal synchronous signals from said auxiliary video signal, said main color signals, said main vertical and horizontal synchronous signals, said auxiliary color signals and said auxiliary vertical and horizontal synchronous signals serving as said main picture carrying signals, said main synchronous signals, said sub-picture carrying signals and said auxiliary synchronous signals, respectively.

11. The television receiver as set forth in claim 10, in which said image reducing unit comprises:

an analog-to-digital converter for converting said auxiliary color signals into digital color signals, a horizontal reducing filter responsive to said first control signal for thinning out said digital color signals in said first direction, and a vertical reducing filter responsive to said second control signal for thinning out said digital color signals in said second direction, said horizontal reducing filter and said vertical reducing filter producing first reduced digital color signals serving as said first reduced sub-picture carrying signals.

12. The television receiver as set forth in claim 11, in which said memory unit comprises a rewritable memory responsive to said write-in timing signal for storing said image data indicated by said first reduced digital color signals, said memory unit being further responsive to said read-out timing signal for outputting said image data in a digital form, and a digital-to-analog converter supplied with said image data from said rewritable memory for producing reduced color signals serving as said second reduced sub-picture carrying signals.

13. The television receiver as set forth in claim 12, in which said first controlling unit is associated with a memory unit for storing a first piece of control data information indicative of the value of said first control signal serving as first coefficients used in a digital filtering and a second piece of control data information indicative of the value of said second control signal serving as second coefficients used in a digital filtering.

* * * * *